(12) United States Patent
Rho

(10) Patent No.: US 7,788,914 B2
(45) Date of Patent: Sep. 7, 2010

(54) APPARATUS OPERATING HYDRAULIC ACTUATOR FOR VALVE

(75) Inventor: Byoung-Hoo Rho, Daejeon (KR)

(73) Assignee: RPM Tech Co., Ltd., Daejeon (KR)

( * ) Notice: Subject to any disclaimer, the term of this patent is extended or adjusted under 35 U.S.C. 154(b) by 315 days.

(21) Appl. No.: 11/942,467

(22) Filed: Nov. 19, 2007

(65) Prior Publication Data

US 2009/0107568 A1 Apr. 30, 2009

(30) Foreign Application Priority Data

Oct. 5, 2007 (KR) .................. 10-2007-0100237

(51) Int. Cl.
*F15B 9/09* (2006.01)
*F16K 31/122* (2006.01)
(52) U.S. Cl. .......................... 60/402; 91/420
(58) Field of Classification Search ............. 91/420; 60/402
See application file for complete search history.

(56) References Cited

U.S. PATENT DOCUMENTS

| | | | | |
|---|---|---|---|---|
| 3,877,347 | A | * | 4/1975 | Sheesley et al. ............... 60/400 |
| 4,460,152 | A | * | 7/1984 | DiPasquale et al. ........... 60/402 |
| 4,679,764 | A | * | 7/1987 | Smith et al. ................... 251/14 |
| 5,577,532 | A | * | 11/1996 | Palmer ........................ 137/460 |
| 7,591,133 | B2 | * | 9/2009 | Wright ......................... 60/402 |

FOREIGN PATENT DOCUMENTS

| | | |
|---|---|---|
| JP | 63072902 | 4/1988 |
| JP | 7332531 | 12/1995 |
| KR | 20020058648 | 7/2002 |
| KR | 20030038606 | 5/2003 |
| KR | 20040082901 | 9/2004 |
| KR | 1000668444 | 1/2007 |

* cited by examiner

*Primary Examiner*—Thomas E Lazo
(74) *Attorney, Agent, or Firm*—The Webb Law Firm

(57) ABSTRACT

The present invention relates to an apparatus operating a hydraulic actuator for valve, which can manually operate the hydraulic actuator for opening and closing the valve by which a flow rate is adjusted. According to the present invention, by manually operating the hydraulic actuator for opening and closing the valve, there is an advantage of manually opening and closing the valve and thus easily adjusting a flow rate of fluid flowing in a pipe, even when power is cut off. Further, according to the present invention, the hydraulic actuator for opening and closing the valve can be selectively connected with a hydraulic power pack so as to automatically open and close the valve using the hydraulic power pack according to a user's selection, or which can manually open and close the valve.

6 Claims, 7 Drawing Sheets

APPARATUS OPERATING HYDRAULIC ACTUATOR FOR VALVE

TECHNICAL FIELD

The present invention relates to an apparatus operating a hydraulic actuator for a valve, and more particularly, to an apparatus operating a hydraulic actuator for valve, which can manually operate the hydraulic actuator for opening and closing the valve by which a flow rate is adjusted.

BACKGROUND ART

A conventional apparatus operating a hydraulic actuator for opening and closing a valve has employed a hydraulic power pack.

However, in the valve opening/closing system which uses the hydraulic power pack for operating the hydraulic actuator for opening and closing the valve, when power is cut off by a stoppage of power supply and the like, the hydraulic actuator for opening and closing the valve can not be operated. Further, there is a disadvantage that a separate power supplying device should be provided to operate the hydraulic actuator.

TECHNICAL PROBLEM

An object of the present invention is to provide an apparatus operating a hydraulic actuator for a valve, which can manually operate the hydraulic actuator for opening and closing the valve by a simple pumping operation.

Another object of the present invention is to provide an apparatus operating a hydraulic actuator for a valve, which can be selectively connected with a hydraulic power pack so as to automatically open and close the valve using the hydraulic power pack according to a user's selection, or which can open and close the valve by a manual pumping operation.

TECHNICAL SOLUTION

In order to solve the above problem, the present invention provides an apparatus operating a hydraulic actuator for opening/closing a valve, comprising a first pump port which is connected with an outlet part of a hand pump; a second pump port which is connected with an inlet part of the hand pump; a first supply port which is connected with the first pump port to supply operating fluid; a second supply port which is connected with the second pump port to supply the operating fluid; a first actuator port which can be connected with the hydraulic actuator; a second actuator port which can be connected with the hydraulic actuator; a first direction port which is connected with the first actuator port; a second direction port which is connected with the second actuator port; a direction converting valve which is disposed between the first and second pump ports and the first and second direction ports, and functions to connect the first pump port with one of the first and second direction ports and connect the second pump port with the rest of them so as to convert a flowing path of the operating fluid; a first supply side pilot check valve which is disposed between the first supply port and the first pump port; a second supply side pilot check valve which is disposed between the second supply port and the second pump port; a first actuator side pilot check valve which is disposed between the first direction port and the first actuator port; a second actuator side pilot check valve which is disposed between the second direction port and the second actuator port; a first actuator side pilot path which is disposed so that a pressure of the operating fluid from the second direction port is served as a pilot pressure on the first actuator side pilot check valve; and a second actuator side pilot path which is disposed so that a pressure of the operating fluid from the first direction port is served as a pilot pressure on the second actuator side pilot check valve.

Preferably, the apparatus operating a hydraulic actuator for opening/closing a valve further comprises a first relief valve which is provided between the first actuator port and the first direction port so as to be parallel with the first actuator side pilot check valve and functions to reduce the pressure of the operating fluid in the hydraulic actuator, and a second relief valve which is provided between the second actuator port and the second direction port so as to be parallel with the second actuator side pilot check valve and functions to reduce the pressure of operating fluid in the hydraulic actuator.

Preferably, the second pump port is connected with an operating fluid supplement tank for supplementing the operating fluid.

Preferably, the first and second supply ports are formed into a quick coupler each.

Preferably, the apparatus operating a hydraulic actuator for opening/closing a valve further comprises, a first supply side pilot path which is disposed so that the pressure of the operating fluid from the second supply port is served as pilot pressure on the first supply side pilot check valve, a second supply side pilot path which is disposed so that the pressure of the operating fluid from the first supply port is served as pilot pressure on the second supply side pilot check valve, and a switching valve which is disposed between the first pump port and the second pump port so as to open and close a flowing path of the operating fluid through the hand pump.

Preferably, the apparatus operating a hydraulic actuator for opening/closing a valve further comprises a first relief valve which is provided between the first actuator port and the first direction port so as to be parallel with the first actuator side pilot check valve and functions to reduce the pressure of the operating fluid in the hydraulic actuator, and a second relief valve which is provided between the second actuator port and the second direction port so as to be parallel with the second actuator side pilot check valve and functions to reduce the pressure of the operating fluid in the hydraulic actuator.

Further, the present invention provides an apparatus operating a hydraulic actuator for opening/closing a valve, comprising a first pump port which is connected with an outlet part of a hand pump; a second pump port which is connected with an inlet part of the hand pump; a first supply port which is formed into a quick coupler and connected with the first pump port to supply operating fluid; a second supply port which is formed into a quick coupler and connected with the second pump port to supply the operating fluid; a first actuator port which can be connected with the hydraulic actuator; a second actuator port which can be connected with the hydraulic actuator; a first direction port which is connected with the first actuator port; a second direction port which is connected with the second actuator port; a direction converting valve which is disposed between the first and second pump ports and the first and second direction ports, and functions to connect the first pump port with one of the first and second directional ports and connect the second pump port with the rest of them so as to convert a flowing path of the operating fluid; a first actuator side pilot check valve which is disposed between the first direction port and the first actuator port; a second actuator side pilot check valve which is disposed between the second direction port and the second actuator port; a first pilot path which is disposed so that a pressure of the operating fluid from the second direction port is served as a pilot pressure on the first actuator side pilot check valve; and a second pilot path which is disposed so that a pressure of the operating fluid from the first direction port is served as a pilot pressure on the second actuator side pilot check valve.

ADVANTAGEOUS EFFECTS

According to the present invention, by manually operating the hydraulic actuator for opening and closing the valve, there is an advantage of manually opening and closing the valve and thus easily adjusting a flow rate of fluid flowing in a pipe, even when power is cut off.

Further, according to the present invention, the apparatus operating the hydraulic actuator for opening and closing the valve can be selectively connected with a hydraulic power pack so as to automatically open and close the valve using the hydraulic power pack according to a user's selection, or which can manually open and close the valve.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
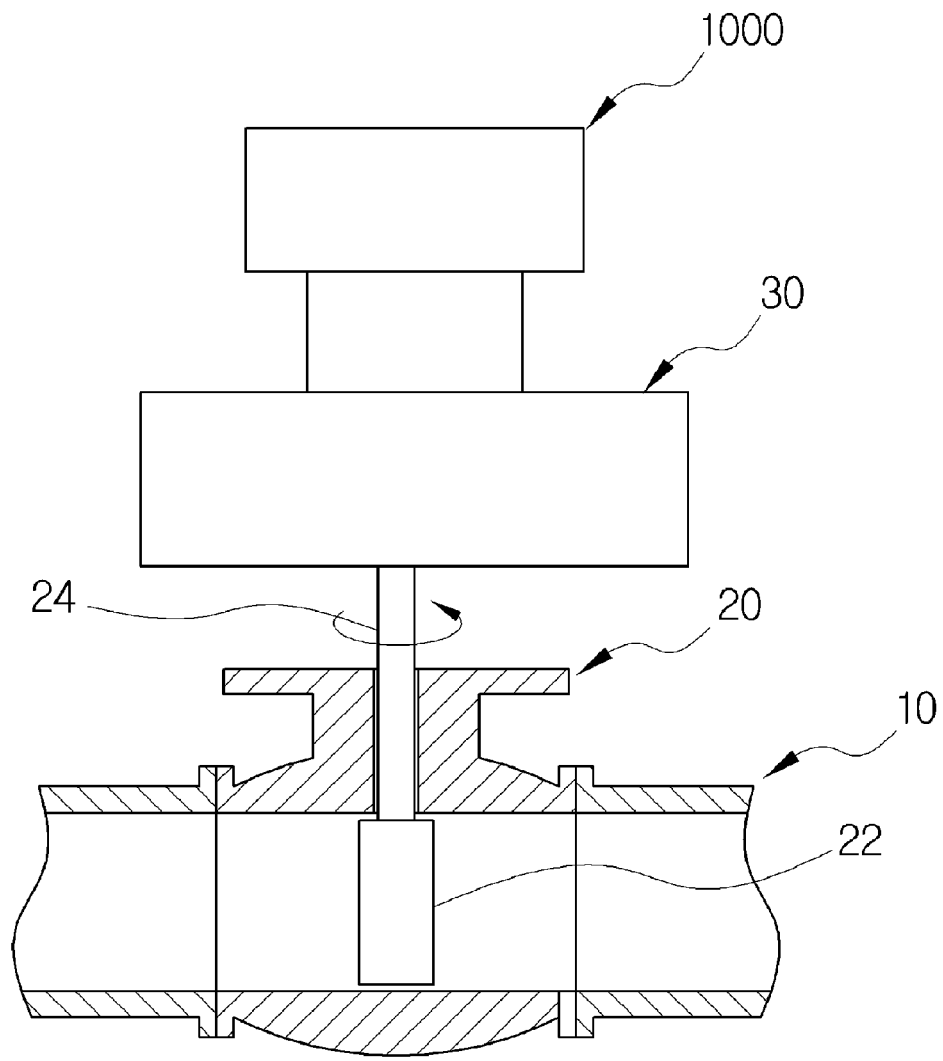
FIG. 1 is a schematic view of a valve opening/closing system in which a first embodiment is applied according to the present invention.

10: pipe 20: valve
22: valve disk 24: valve stem
30: hydraulic actuator for opening/closing a valve
32: pinion 34: rack
36-1: first cylinder 36-2: second cylinder
38-1: first cylinder port 38-2: second cylinder port
40: hydraulic power pack
42-1: first hydraulic power pack port
42-2: second hydraulic power pack port
1000: apparatus operating a hydraulic actuator for opening/closing a valve
 1110-1: first actuator port 1110-2: second actuator port
 1120-1: first actuator side pilot check valve
 1120-2: second actuator side pilot check valve
 1130-1: first actuator side pilot path
 1130-2: second actuator side pilot path
 1140-1: first direction port 1140-2: second direction port
 1150: direction converting valve
 1160-1: first pump port 1160-2: second pump port
 1170: hand pump
 1180-1: first supply side pilot check valve
 1180-2: second supply side pilot check valve
 1190-1: first supplying port 1190-2: second supply port
 1200-1: first relief valve 1200-2: second relief valve
 1210: operating fluid supplement tank 1220: operating fluid supplement valve
2000: apparatus operating a hydraulic actuator for opening/closing a valve
 2110-1: first actuator port 2110-2: second actuator port
 2120-1: first actuator side pilot check valve
 2120-2: second actuator side pilot check valve
 2130-1: first actuator side pilot path
 2130-2: second actuator side pilot path
 2140-1: first direction port 2140-2: second direction port
 2150: direction converting valve
 2160-1: first pump port 2160-2: second pump port
 2170: hand pump
 2180-1: first supply side pilot check valve
 2180-2: second supply side pilot check valve
 2190-1: first supply port 2190-2: second supply port
 2200-1: first relief valve 2200-2: second relief valve
 2210: operating fluid supplement tank 2220: operating fluid supplement valve
 2230: switching valve
 2240-1: first supply side pilot path
 2240-2: second supply side pilot path

BEST MODE

Hereinafter, the embodiments of the present invention will be described in detail with reference to accompanying drawings.

First Embodiment

Figure 2:
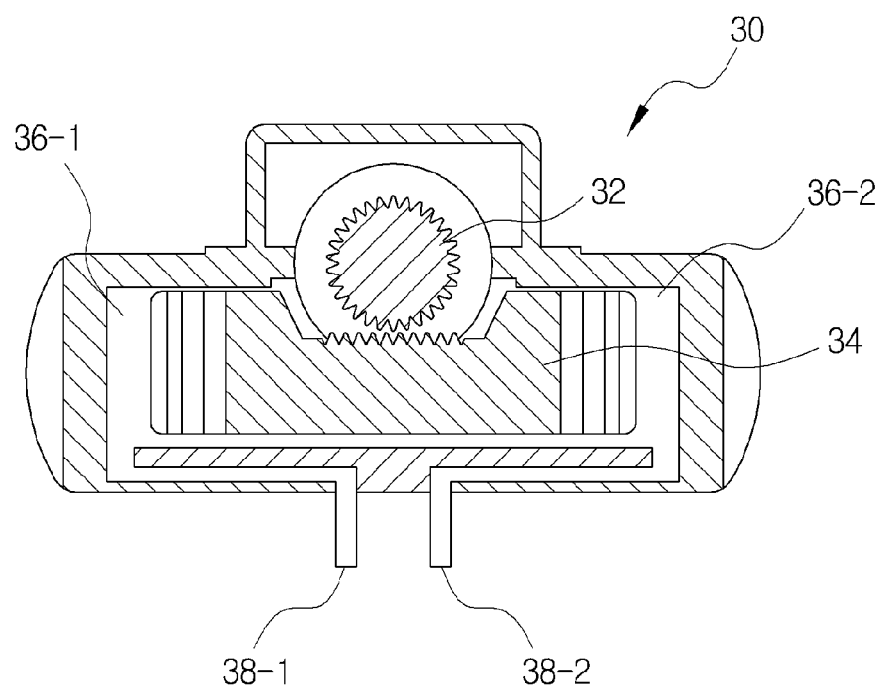
FIG. 2 is a cross-sectional view of the hydraulic actuator for opening and closing the valve of FIG. 1.
Figure 3:
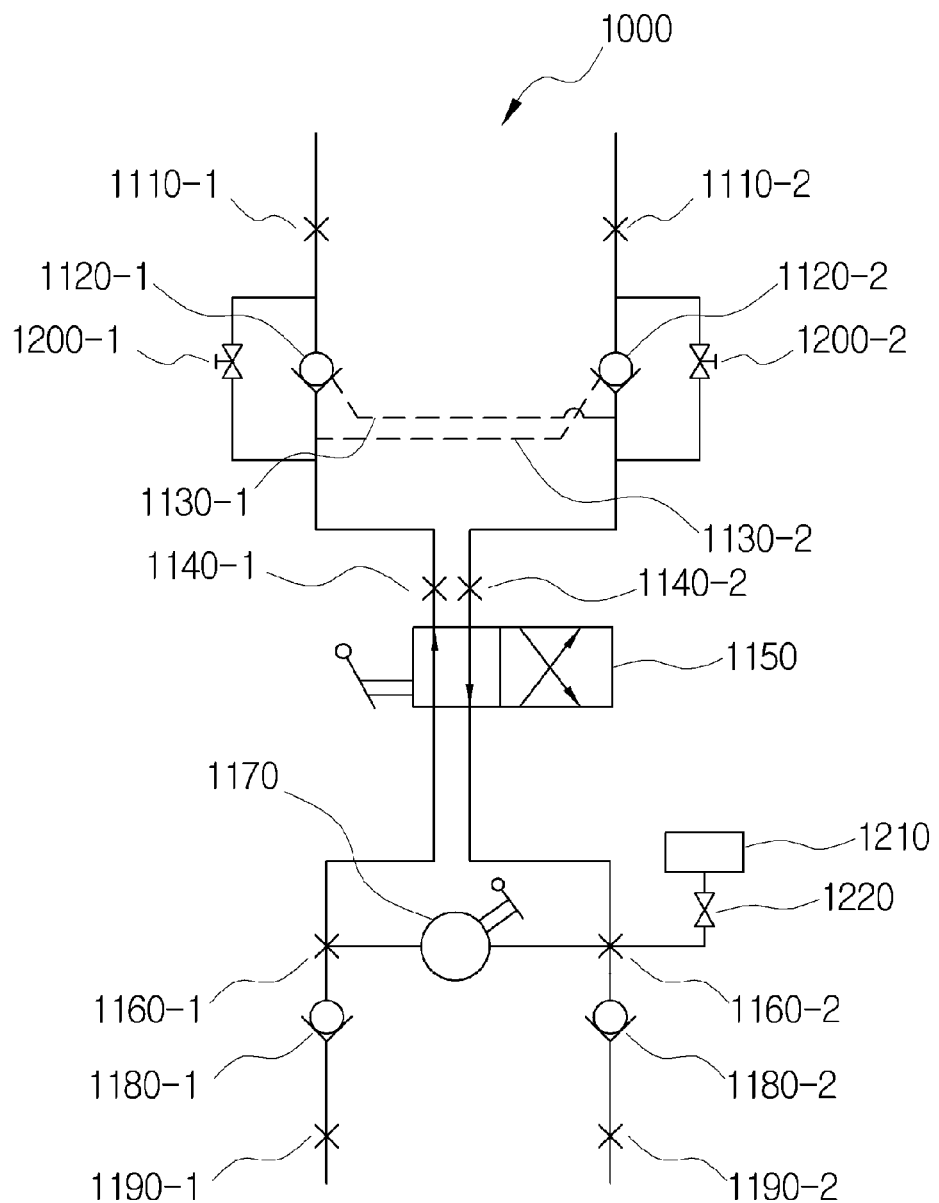
FIG. 3 is a hydraulic circuit diagram of the first embodiment of the present invention.
Figure 4:
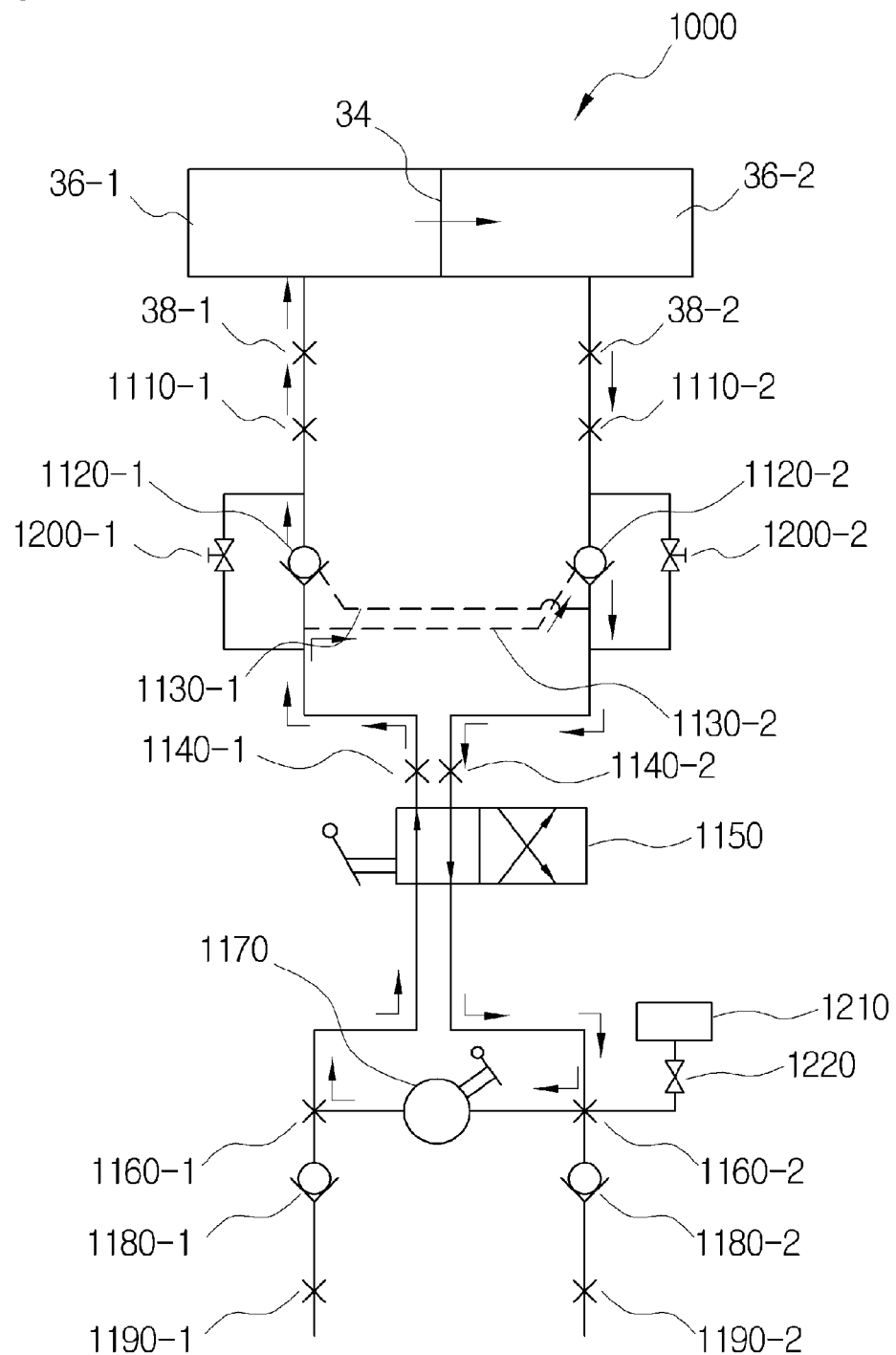
FIG. 4 is a hydraulic circuit diagram of the valve opening/closing system in which the first embodiment is applied according to the present invention.

The first embodiment relates to an apparatus operating a hydraulic actuator for opening/closing a valve according to the present invention. FIG. 1 is a schematic view of a valve opening/closing system in which a first embodiment is applied according to the present invention, FIG. 2 is a cross-sectional view of the hydraulic actuator for opening and closing the valve of FIG. 1, FIG. 3 is a hydraulic circuit diagram of the first embodiment of the present invention and FIG. 4 is a hydraulic circuit diagram of the valve opening/closing system in which the first embodiment is applied according to the present invention.

Referring to FIG. 1, the valve opening/closing system includes a pipe 10, a valve 20, a hydraulic actuator 30 for opening/closing a valve and an apparatus 1000 operating the hydraulic actuator for opening/closing the valve. The apparatus 1000 operating the hydraulic actuator for opening/closing the valve is constructed on the basis of the first embodiment.

The pipe 10 is typical one which is used for water supply and drainage and the like so as to transfer fluid.

The valve 20 includes a valve disk 22 and a valve stem 24 which is integrally connected with the valve disk 22. The valve disk 22 is rotated by rotation of the valve stem 24 so as to open and close a transverse section formed in the valve 20, so that a flow rate of fluid running in the pipe 10 connected with the valve 20 can be adjusted.

Referring to FIG. 2, the hydraulic actuator 30 for opening/closing the valve includes a pinion 32 which is integrally connected with the valve stem 24, a rack 34 which rotates the pinion 32 by linear movement thereof, first and second cylinders 36-1 and 36-2 which guide both ends of the rack 34 so that the rack 34 can be linearly reciprocated, a first cylinder port 38-1 which is communicated with the first cylinder 36-1, and a second cylinder port 38-2 which is communicated with the second cylinder 36-2.

Referring to FIGS. 1 and 2, the rack 34 is linearly moved by a pressure difference between the first and second cylinders 36-1 and 36-2, and thus the pinion 32 is rotated and the valve stem 24 is also rotated, thereby adjusting the flow rate of the fluid flowing in the pipe 10 by the valve disk 22.

As shown in FIG. 1, the hydraulic actuator 30 for opening/closing the valve is connected to the apparatus 1000 operating the hydraulic actuator for opening/closing the valve.

Referring to FIG. 3, the apparatus 1000 operating the hydraulic actuator for opening/closing the valve includes first and second actuator ports 1110-1 and 1110-2, first and second actuator side pilot check valves 1120-1 and 1120-2, first and second actuator side pilot paths 1130-1 and 1130-2, first and second direction ports 1140-1 and 1140-2, a direction converting valve 1150, first and second pump ports 1160-1 and 1160-2, a hand pump 1170, first and second supply side pilot check valves 1180-1 and 1180-2, and first and second supply ports 1190-1 and 1190-2.

Referring to FIG. 4, the first actuator port 1110-1 is a connection part through which operating fluid supplied in the first embodiment is transferred to the first cylinder port 38-1, and the second actuator port 1110-2 is a connection part through which operating fluid supplied in the first embodiment is transferred to the second cylinder port 38-2.

Referring to FIG. 3, the first direction port 1140-1 is communicated with the first actuator port 1110-1 through the first actuator side pilot check valve 1120-1, and the second direction port 1140-2 is communicated with the second actuator port 1110-2 through the second actuator side pilot check valve 1120-2. The first actuator side pilot check valve 1120-1 is arranged so that the operating fluid is flowed forward from the first directional port 1140-1 to the first actuator port 1110-1, and the second actuator side pilot check valve 1120-2 is arranged so that the operating fluid is flowed forward from the second directional port 1140-2 to the second actuator port 1110-2.

As shown in FIG. 3, the first actuator side pilot path 1130-1 is formed so that the pressure of the operating fluid from the second direction port 1140-2 functions as pilot pressure on the first actuator side pilot check valve 1120-1, and the second actuator side pilot path 1130-2 is formed so that the pressure of the operating fluid from the first direction port 1140-1 functions as pilot pressure on the second actuator side pilot check valve 1120-2.

The first pump port 1160-1 is communicated with an outlet part of the hand pump 1170, and the second pump port 1160-2 is communicated with an inlet part of the hand pump 1170.

Further, the direction converting valve 1150 is disposed between the first and second direction ports 1140-1 and 1140-2 and the first and second pump ports 1160-1 and 1160-2. The direction converting valve 1150 functions to connect the first pump port 1160-1 with one of the first and second direction ports 1140-1 and 1140-2 and also connect the second pump port 1160-2 with the rest of them according to a user's selection, thereby converting a flowing path of the operating fluid in the apparatus 1000 operating the hydraulic actuator for opening/closing the valve. In FIG. 3, the direction converting valve 1150 connects the first pump port 1160-1 to the first direction port 1140-1 and also connects the second pump port 1160-2 to the second direction port 1140-2.

In addition, the first and second supply ports 1190-1 and 1190-2 functions as a supplying path for supplying the operating fluid from the outside to the apparatus 1000 operating the hydraulic actuator for opening/closing the valve. In order to prevent a leakage of the operating fluid from the apparatus 1000 operating the hydraulic actuator for opening/closing the valve and also maintain an internal pressure of the apparatus 1000 operating the hydraulic actuator for opening/closing the valve, the first and second supply ports 1190-1 and 1190-2 may be formed into a quick coupler each.

The first supply port 1190-1 is communicated with the first pump port 1160-1 through the first supply side pilot check valve 1180-1, and the second supply port 1190-2 is communicated with the second pump port 1160-2 through the second supply side pilot check valve 1180-2. The first supply side pilot check valve 1180-1 is arranged so that the operating fluid is flowed forward from the first supply port 1190-1 to the first pump port 1160-1, and the second supply side pilot check valve 1180-2 is arranged so that the operating fluid is flowed forward from the second supply port 1190-2 to the second pump port 1160-2.

A first relief valve 1200-1 may be selectively provided between the first actuator port 1110-1 and the first direction port 1140-1 so as to be parallel with the first actuator side pilot check valve 1120-1, and a second relief valve 1200-2 may be selectively provided between the second actuator port 1110-2 and the second direction port 1140-2 so as to be parallel with the second actuator side pilot check valve 1120-2. The first relief valve 1200-1 functions to reduce the pressure of the operating fluid at the side of the first actuator port 1110-1, and the second relief valve 1200-2 functions to reduce the pressure of the operating fluid at the side of the second actuator port 1110-2.

Referring to FIG. 2, according as the pressure of the operating fluid at the side of the first actuator port 1110-1 is reduced, the pressure of the operating fluid in the first cylinder 36-1 communicated with the first actuator port 1110-1 is reduced, and also according as the pressure of the operating fluid at the side of the second actuator port 1110-2 is reduced, the pressure of the operating fluid in the second cylinder 36-2 communicated with the second actuator port 1110-2 is reduced.

Referring again to FIG. 3, the second pump port 1160-2 may be connected with an operating fluid supplement tank 1210 through an operating fluid supplement valve 1220. The operating fluid supplement tank 1210 functions to supplement the operating fluid, when the operating fluid is insufficient by the pumping operation of the hand pump 1170.

Hereinafter, an operation of the apparatus 1000 operating the hydraulic actuator for opening/closing the valve according to the first embodiment will be described.

Referring to FIG. 4, since the quick coupler is used as the first and second supply ports 1190-1 and 1190-2, it is possible to prevent the leakage of the operating fluid from the apparatus 1000 operating the hydraulic actuator for opening/closing the valve to the outside and also to be easily connected with an external device for supplying the operating fluid. Further, since the apparatus 1000 operating the hydraulic actuator for opening/closing the valve includes the first and second supply side pilot check valves 1180-1 and 1180-2, it is possible to prevent the leakage of the operating fluid and the pressure loss, when the external device is removed.

When a user performs a pumping operation using the hand pump 1170, the operating fluid is flowed by a high pressure. At this time, the operating fluid passing through the first pump port 1160-1 is prevented from being flowed to the first supply port 1190-1 by the first supply side pilot check valve 1180-1.

In FIG. 4, since the first actuator side pilot check valve 1120-1 is arranged so that the operating fluid is flowed forward from the first direction-port 1140-1 to the first actuator port 1110-1, and the first pump port 1160-1 and the first actuator port 1110-1 are communicated with each other by the direction converting valve 1150, the operating fluid passing through the first pump port 1160-1 is flowed to the first actuator port 1110-1 through the first actuator side pilot check valve 1120-1.

Further, since the operating fluid in the first actuator port 1110-1 is connected with the operating fluid in the first pump port 1160-1, the operating fluid in the first actuator port 1110-1 is flowed to the hydraulic actuator 30 for opening/closing the valve by the pumping operation of the hand pump 1170.

Referring to FIG. 2, since the first actuator port 1110-1 is communicated with the first cylinder port 38-1, and the first cylinder port 38-1 is also communicated with the first cylinder 36-1, the operating fluid is introduced into the first cylinder 36-1.

If the operating fluid is introduced into the first cylinder 36-1, the rack 34 is linearly moved to the second cylinder 36-2, and the pinion 32 is rotated, and thus the valve stem 24 is rotated. The valve disk 22 is also rotated by the rotation of the stem 24 so as to open and close the transverse section of the flowing path in the valve 20.

Referring to FIG. 4, since the second actuator side pilot path 1130-2 is disposed so that the pressure of the operating fluid from the first direction port 1140-1 is served as the pilot pressure on the second actuator side pilot check valve 1120-2, according as the pressure at the first direction port 1140-1 is increased, the second actuator side pilot check valve 1120-2 is opened and thus the operating fluid in the second cylinder 36-2 can be discharged to the second cylinder port 38-2. Meanwhile, when the operating fluid in the second cylinder 36-2 can be discharged to the second cylinder port 38-2, the rack 34 is linearly moved from the first cylinder 36-1 to the second cylinder 36-2.

Moreover, according as the second actuator side pilot check valve 1120-2 is opened, the second cylinder port 38-2, the second actuator port 1110-2, the second direction port 1140-2 and the second pump port 1160-2 are communicated with each other. Thus, the operating fluid is flowed from the second cylinder port 38-2 to the second pump port 1160-2.

Since the operating fluid in the second pump port 1160-2 can not be flowed to the second supply port 1190-2 by the second supply side pilot check valve 1180-2, the operating fluid is flowed to the hand pump 1170.

Referring to FIG. 4, the operating fluid is flowed in the arrow direction, i.e., the clockwise direction.

That is, in the valve opening/closing system in which the first embodiment is applied, as described above, the hydraulic actuator 30 for opening/closing the valve is operated by the pumping operation of the hand pump 1170. Thus, the valve 20 is operated so as to adjust the flow rate of the fluid flowing in the pipe 10 connected with the valve 20.

Meanwhile, in case that the internal pressure of the first and second cylinders 36-1 and 36-2 is so high, the internal pressure can be reduced by using the first and second relief valves 1200-1 and 1200-2. Therefore, it is possible to reduce the pumping operation of the hand pump 1170 for operating the hydraulic actuator 30 for opening/closing the valve.

Further, since the second pump port 1160-2 and the operating fluid supplement tank 1210 are communicated with each other by the operating fluid supplement valve 1220, the operating fluid can be supplemented when the operating fluid is insufficient by the pumping operation of the hand pump 1170.

In case of the first embodiment, there are provided the first and second supply side pilot check valves 1180-1 and 1180-2. However, the first and second supply side pilot check valves 1180-1 and 1180-2 may be not provided in other embodiment. In this case, it is preferable that the first and second supply ports 1190-1 and 1190-2 are the quick couplers to prevent the leakage of the operating fluid from the apparatus 1000 operating the hydraulic actuator for opening/closing the valve and also to maintain the internal pressure of the apparatus 1000 operating the hydraulic actuator for opening/closing the valve.

Second Embodiment

Figure 5:
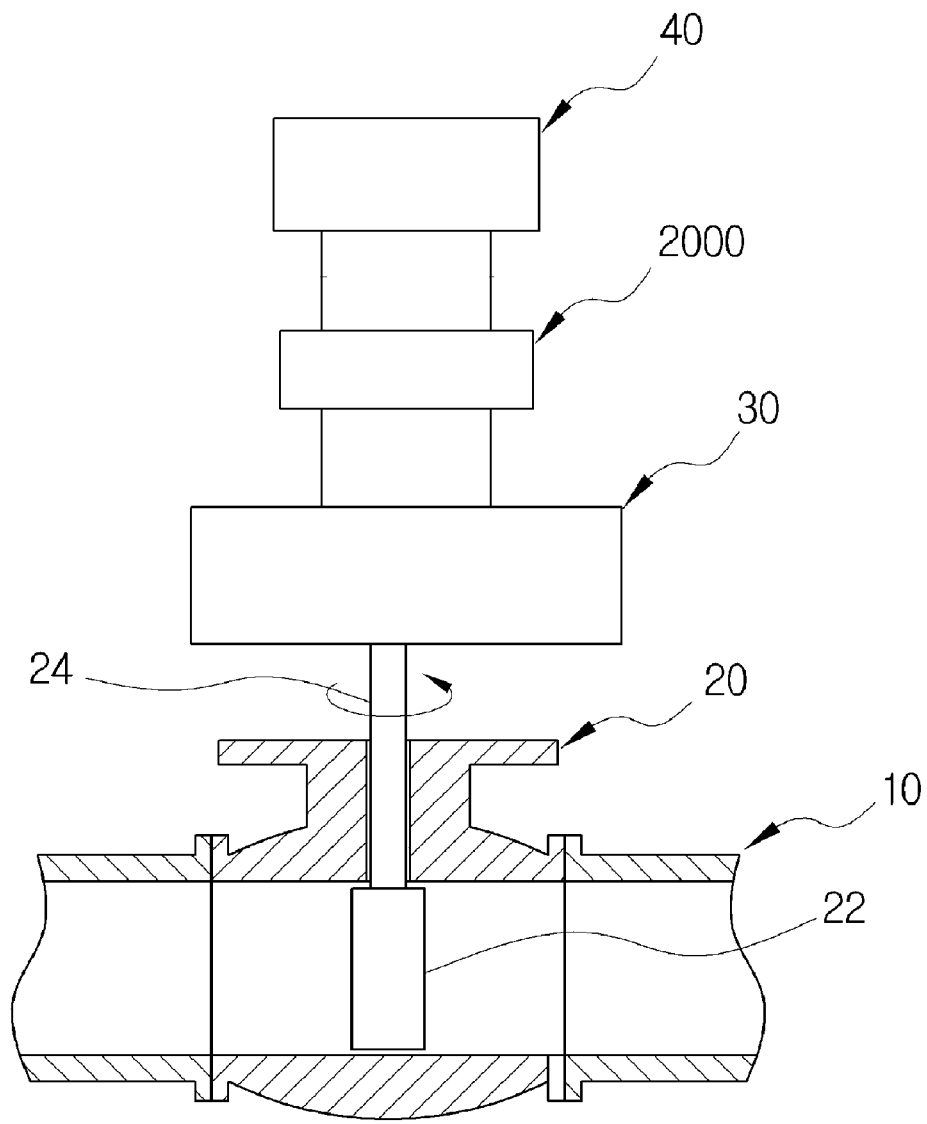
FIG. 5 is a schematic view of a valve opening/closing system in which a second embodiment is applied according to the present invention.

The second embodiment relates to an apparatus operating a hydraulic actuator for opening/closing a valve according to the present invention. FIG. 5 is a schematic view of a valve opening/closing system in which a second embodiment is applied according to the present invention, FIG. 6 a hydraulic circuit diagram of the second embodiment of the present invention and FIG. 7 is a hydraulic circuit diagram of the valve opening/closing system in which the second embodiment is applied according to the present invention.

Since the pipe 10, the valve 20, the valve disk 22, the valve stem 24 and the hydraulic actuator 30 for opening/closing the valve are the same as those in the first embodiment, the description thereof will be omitted.

Referring to FIG. 5, the hydraulic actuator 30 for opening/closing the valve is connected to the apparatus 2000 operating the hydraulic actuator for opening/closing the valve according to the second embodiment.

Figure 6:
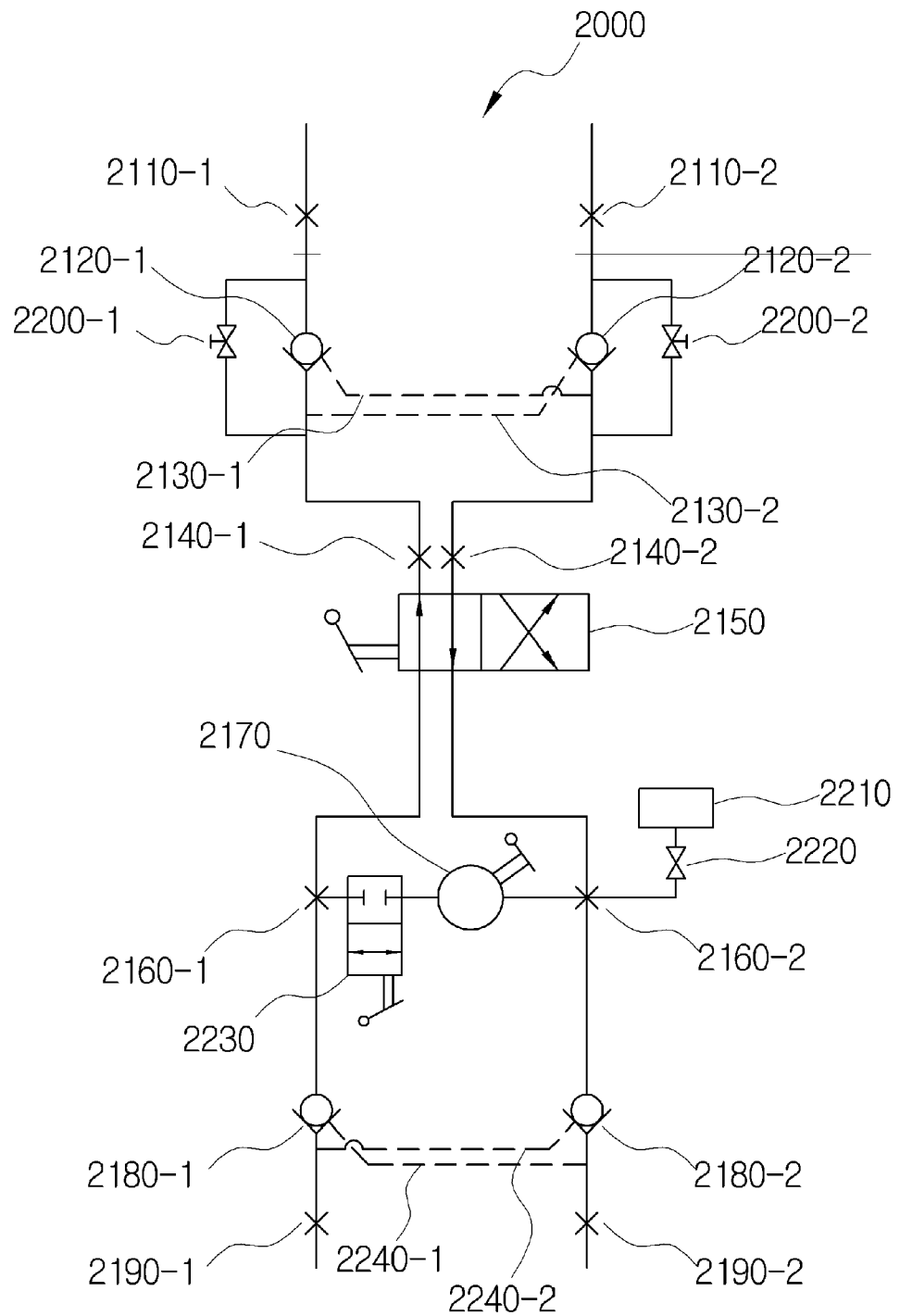
FIG. 6 a hydraulic circuit diagram of the second embodiment of the present invention.
Figure 7:
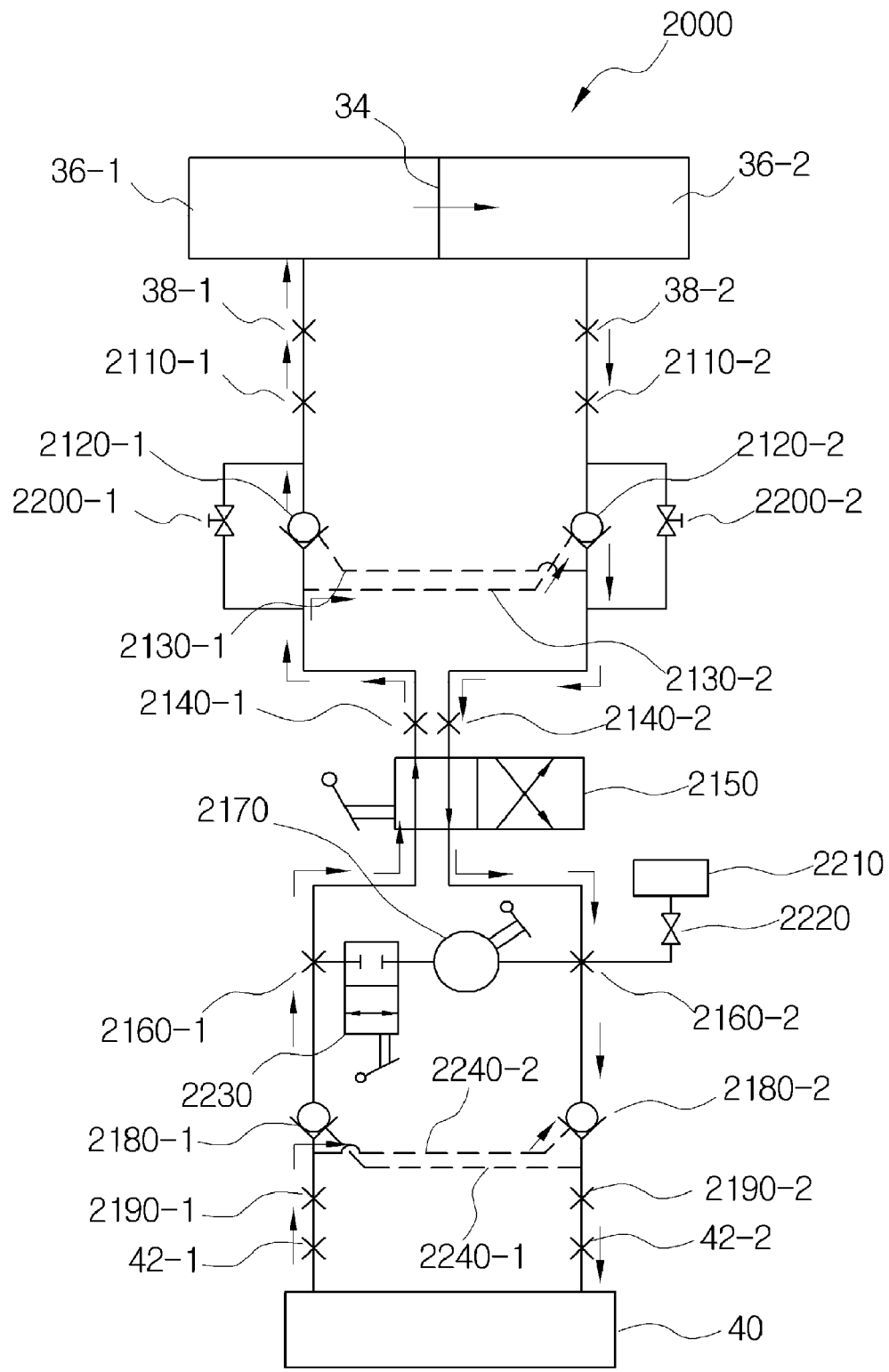
FIG. 7 is a hydraulic circuit diagram of the valve opening/closing system in which the second embodiment is applied according to the present invention.

Referring to FIG. 6, the apparatus 2000 operating the hydraulic actuator for opening/closing the valve includes first and second actuator ports 2110-1 and 2110-2, first and second actuator side pilot check valves 2120-1 and 2120-2, first and second actuator side pilot paths 2130-1 and 2130-2, first and second direction ports 2140-1 and 2140-2, a direction converting valve 2150, first and second pump ports 2160-1 and 2160-2, a hand pump 2170, first and second supply side pilot check valves 2180-1 and 2180-2, first and second supply ports 2190-1 and 2190-2, a switching valve 2230, and first and second supply side pilot paths 2240-1 and 2240-2.

Referring to FIG. 7, the first actuator port 2110-1 is a connection part through which operating fluid supplied in the second embodiment is transferred to a first cylinder port 38-1, and the second actuator port 2110-2 is a connection part through which operating fluid supplied in the second embodiment is transferred to a second cylinder port 38-2.

Referring to FIG. 6, the first direction port 2140-1 is communicated with the first actuator port 2110-1 through the first actuator side pilot check valve 2120-1, and the second direction port 2140-2 is communicated with the second actuator port 2110-2 through the second actuator side pilot check valve 2120-2. The first actuator side pilot check valve 2120-1 is arranged so that the operating fluid is flowed forward from the first direction port 2140-1 to the first actuator port 2110-1, and the second actuator side pilot check valve 2120-2 is arranged so that the operating fluid is flowed forward from the second direction port 2140-2 to the second actuator port 2110-2.

As shown in FIG. 6, the first actuator side pilot path 2130-1 is formed so that the pressure of the operating fluid from the second direction port 2140-2 functions as pilot pressure on the first actuator side pilot check valve 2120-1, and the second actuator side pilot path 2130-2 is formed so that the pressure of the operating fluid from the first directional port 2140-1 functions as pilot pressure on the second actuator side pilot check valve 2120-2.

The first pump port 2160-1 is communicated with an outlet part of the hand pump 2170, and the second pump port 2160-2 is communicated with an inlet part of the hand pump 2170.

The switching valve 2230 is disposed between the first pump port 2160-1 and the hand pump 2170. The switching valve 2230 functions to open and close a flowing path of the operating fluid passing through the hand pump 2170 according to a user's selection. Therefore, in the present invention, the switching valve 2230 may be disposed between the second pump port 2160-2 and the hand pump 2170. FIG. 6 shows a status that the flowing path of the operating fluid between the first pump port 2160-1 and the hand pump 2170 is blocked by the switching valve 2230.

Further, the direction converting valve 1150 is disposed between the first and second direction ports 2140-1 and 2140-2 and the first and second pump ports 2160-1 and 2160-2. The direction converting valve 1150 functions to connect the first pump port 2160-1 with one of the first and second direction ports 2140-1 and 2140-2 and also connect the second pump port 2160-2 with the rest of them according to a user's selection, thereby converting a flowing path of the operating fluid in the apparatus 2000 operating the hydraulic actuator for opening/closing the valve. In FIG. 6, the direction converting valve 2150 connects the first pump port 2160-1 to the first direction port 2140-1 and also connects the second pump port 2160-2 to the second direction port 2140-2.

Referring to FIG. 7, the first supply port 2190-1 is communicated with a first hydraulic power pack port 42-1, and the second supply port 2190-2 is communicated with a second hydraulic power pack port 42-2. Although not shown in drawings, the first hydraulic power pack port 42-1 is connected to an outlet part of a power pump (not shown) in a hydraulic power pack 40, and the second hydraulic power pack port 42-2 is connected to an inlet part of the power pump (not shown) in the hydraulic power pack 40. In other words, the first and second supply ports 2190-1 and 2190-2 functions as a connection path for connecting the hydraulic power pack 40 to the apparatus 2000 operating the hydraulic actuator for opening/closing the valve. In order to prevent a leakage of the operating fluid introduced from the hydraulic power pack 40 and also maintain an internal pressure of the apparatus 2000 operating the hydraulic actuator for opening/closing the valve, the first and second supply ports 2190-1 and 2190-2 may be formed into a quick coupler each.

Referring to FIG. 6, the first supply port 2190-1 is communicated with the first pump port 2160-1 through the first supply side pilot check valve 2180-1, and the second supply port 2190-2 is communicated with the second pump port 2160-2 through the second supply side pilot check valve 2180-2. The first supply side pilot check valve 2180-1 is arranged so that the operating fluid is flowed forward from the first supply port 2190-1 to the first pump port 2160-1, and the second supply side pilot check valve 2180-2 is arranged so that the operating fluid is flowed forward from the second supply port 2190-2 to the second pump port 2160-2.

As shown in FIG. 6, the first supply side pilot path 2240-1 is formed so that the pressure of the operating fluid from the second supply port 2190-2 functions as pilot pressure on the first supply side pilot check valve 2180-1, and the second supply side pilot path 2240-2 is formed so that the pressure of the operating fluid from the first supply port 2190-1 functions as pilot pressure on the second supply side pilot check valve 2180-2.

A first relief valve 2200-1 is provided between the first actuator port 2110-1 and the first direction port 2140-1 so as to be parallel with the first actuator side pilot check valve 2120-1, and a second relief valve 2200-2 is provided between the second actuator port 2110-2 and the second direction port 2140-2 so as to be parallel with the second actuator side pilot check valve 2120-2. The first relief valve 2200-1 functions to reduce the pressure of the operating fluid at the side of the first actuator port 2110-1, and the second relief valve 2200-2 functions to reduce the pressure of the operating fluid at the side of the second actuator port 2110-2.

Referring to FIG. 6, the second pump port 2160-2 may be connected with an operating fluid supplement tank 2210 through an operating fluid supplement valve 2220. Not shown in FIG. 7, the operating fluid supplement tank 2210 functions to supplement the operating fluid, in case that the operating fluid is insufficient by the pumping operation of the hand pump 2170 when the switching valve 2230 opens the flowing path of the operating fluid between the first pump port 2160 and the hand pump 2170. That is, in case that the transverse section formed in the valve 20 is opened and closed by the hand pump 2170 instead of the hydraulic power pack 40, the operating fluid supplement tank 2210 is to supply the operating fluid when the operating fluid is insufficient by the pumping operation of the hand pump 2170.

Hereinafter, an operation of the apparatus 2000 operating the hydraulic actuator for opening/closing the valve according to the second embodiment will be described.

Referring to FIG. 7, since the flowing path of the operating fluid through the hand pump 2170 is blocked by the switching valve 2230, if the hydraulic power pack 40 is operated, the operating fluid is flowed from the first hydraulic power pack port 42-1 to the first supply port 2190-1.

Since the first supply side pilot check valve 2180-1 is arranged so that the operating fluid is flowed forward from the first supply port 2190-1 to the first pump port 2160-1, the operating fluid is flowed from the first supply port 2190-1 to the first pump port 2160-1.

And since the switching valve 2230 is operated so as to block the flowing path of the operating fluid through the hand pump 2170, the operating fluid passing through the first pump port 2160-1 is flowed to the direction converting valve 2150, but can not be flowed to the hand pump 2170.

Further, since the first actuator side pilot check valve 2120-1 is arranged so that the operating fluid is flowed forward from the first direction port 2140-1 to the first actuator port 2110-1, and the first pump port 2160-1 and the first actuator port 2110-1 are communicated with each other by the direction converting valve 2150, the operating fluid passing through the first pump port 2160-1 is flowed to the first actuator port 2110-1 through the direction converting valve 2150 and the first actuator side pilot check valve 2120-1.

Referring to FIG. 7, as described in the first embodiment, the operating fluid is introduced into the first cylinder 36-1, and the rack 34 is linearly moved to the second cylinder 36-2, and then the pinion 32, the valve stem 24 and the valve disk 22 are rotated so as to open and close the transverse section of the flowing path in the valve 20, thereby adjusting the flow rate of the fluid flowing in the pipe connected with the valve.

And, since the second actuator side pilot path 2130-2 is disposed so that the pressure of the operating fluid from the first direction port 2140-1 is served as the pilot pressure on the second actuator side pilot check valve 2120-2, according as the pressure at the first direction port 2140-1 is increased by a pumping operation of a pump (not shown) in the hydraulic power pack 40, the second actuator side pilot check valve 2120-2 is opened.

Furthermore, the switching valve 2230 is operated so as to block the flowing path of the operating fluid through the hand pump 2170, the operating fluid passing through the second pump port 2160-2 is flowed to the second supply port 2190-2, but can not be flowed to the hand pump 2170.

And, since the second supply side pilot path 2240-2 is disposed so that the pressure of the operating fluid from the first supplying port 2190-1 is served as the pilot pressure on the second supply side pilot check valve 2180-2, according as the pressure at the first supplying port 2190-1 is increased by a pumping operation of a pump (not shown) in the hydraulic power pack 40, the second supply side pilot check valve 2180-2 is opened.

Since the second actuator side pilot check valve 2120-2 and the second supply side pilot check valve 2180-2 are opened, the operating fluid in the second cylinder 36-2 can be discharged to the second cylinder port 38-2.

Referring to FIG. 7, the operating fluid is flowed from the second supply port 2190-2 to the second hydraulic power pack port 42-2 and then introduced into the second hydraulic power pack port 42-2.

And if the flowing path of the operating fluid is converted by the direction converting valve 2150, the rack 34 is moved to the left side and thus the valve disk is rotated reversely.

Further, in case that the internal pressure of the first and second cylinders 36-1 and 36-2 is so high, the internal pressure can be reduced by using the first and second relief valves 2200-1 and 2200-2. Therefore, it is possible to reduce the pumping operation of the hand pump 2170 for operating the hydraulic actuator 30 for opening/closing the valve.

Meanwhile, in order to move the rack 34 by using the hand pump 2170 of the apparatus 2000 operating the hydraulic actuator for opening/closing the valve and thus open and close the valve 20 without using the hydraulic power pack 40, the flowing path of the operating fluid through the hand pump 2170 is opened by operating the switching valve 2230. In this case, the operation is the same as in the first embodiment, and the description thereof will be omitted.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

According to the apparatus operating the hydraulic actuator for opening/closing the valve, since the valve can be manually opened and closed, there is an advantage that a flow rate of fluid flowing in a pipe which is provided at a place where power is not supplied can be adjusted.

Further, if a hydraulic power pack is connected to the apparatus of the present invention, the apparatus can be manually operated according to a user's selection. Therefore, even when the power is cut off, the flow rate of the fluid in the pipe can be adjusted.

And the apparatus of the present invention can be used in operating an actuator for adjusting the flow rate of the fluid in the pipe.

The invention claimed is:

1. An apparatus operating a hydraulic actuator for opening and closing a valve, comprising:
    a first pump port which is connected with an outlet part of a hand pump;
    a second pump port which is connected with an inlet part of the hand pump;
    a first supply port which is connected with the first pump port to supply operating fluid;
    a second supply port which is connected with the second pump port to supply the operating fluid;
    a first actuator port which can be connected with the hydraulic actuator;
    a second actuator port which can be connected with the hydraulic actuator;
    a first direction port which is connected with the first actuator port;
    a second direction port which is connected with the second actuator port;
    a direction converting valve which is disposed between the first and second pump ports and the first and second direction ports, and functions to connect the first pump port with one of the first and second direction ports and connect the second pump port with the rest of them so as to convert a flowing path of the operating fluid;
    a first supply side pilot check valve which is disposed between the first supply port and the first pump port;
    a second supply side pilot check valve which is disposed between the second supply port and the second pump port;
    a first actuator side pilot check valve which is disposed between the first direction port and the first actuator port;
    a second actuator side pilot check valve which is disposed between the second direction port and the second actuator port;
    a first actuator side pilot path which is disposed so that the pressure of the operating fluid from the second direction port is served as a pilot pressure on the first actuator side pilot check valve;
    a second actuator side pilot path which is disposed so that the pressure of the operating fluid from the first direction port is served as a pilot pressure on the second actuator side pilot check valve;
    a first relief valve which is provided between the first actuator port and the first direction port so as to be parallel with the first actuator side pilot check valve and functions to reduce the pressure of the operating fluid in the hydraulic actuator; and
    a second relief valve which is provided between the second actuator port and the second direction port so as to be parallel with the second actuator side pilot check valve and functions to reduce the pressure of the operating fluid in the hydraulic actuator.

2. The apparatus operating a hydraulic actuator for opening and closing a valve according to claim 1, wherein the second pump port is connected with an operating fluid supplement tank for supplementing the operating fluid.

3. The apparatus operating a hydraulic actuator for opening and closing a valve according to claim 1, wherein the first and second supply ports are each formed into a quick coupler.

4. An apparatus operating a hydraulic actuator for opening and closing a valve, comprising:
    a first pump port which is connected with an outlet part of a hand pump;
    a second pump port which is connected with an inlet part of the hand pump;
    a first supply port which is connected with the first pump port to supply operating fluid;
    a second supply port which is connected with the second pump port to supply the operating fluid;
    a first actuator port which can be connected with the hydraulic actuator;
    a second actuator port which can be connected with the hydraulic actuator;

a first direction port which is connected with the first actuator port;

a second direction port which is connected with the second actuator port;

a direction converting valve which is disposed between the first and second pump ports and the first and second direction ports and functions to connect the first pump port with one of the first and second direction ports and connect the second pump port with the rest of them so as to convert a flowing path of the operating fluid;

a first supply side pilot check valve which is disposed between the first supply port and the first pump port;

a second supply side pilot check valve which is disposed between the second supply port and the second pump port;

a first actuator side pilot check valve which is disposed between the first direction port and the first actuator port;

a second actuator side pilot check valve which is disposed between the second direction port and the second actuator port;

a first actuator side pilot path which is disposed so that the pressure of the operating fluid from the second direction port is served as a pilot pressure on the first actuator side pilot check valve; and a second actuator side pilot path which is disposed so that the pressure of the operating fluid from the first direction port is served as a pilot pressure on the second actuator side pilot check valve, wherein the first and second supply ports are each formed into a quick coupler.

5. An apparatus operating a hydraulic actuator for opening and closing a valve, comprising:

a first pump port which is connected with an outlet part of a hand pump;

a second pump port which is connected with an inlet part of the hand pump;

a first supply port which is connected with the first pump port to supply operating fluid;

a second supply port which is connected with the second pump port to supply the operating fluid;

a first actuator port which can be connected with the hydraulic actuator;

a second actuator port which can be connected with the hydraulic actuator;

a first direction port which is connected with the first actuator port;

a second direction port which is connected with the second actuator port;

a direction converting valve which is disposed between the first and second pump ports and the first and second direction ports, and functions to connect the first pump port with one of the first and second direction ports and connect the second pump port with the rest of them so as to convert a flowing path of the operating fluid;

a first supply side pilot check valve which is disposed between the first supply port and the first pump port;

a second supply side pilot check valve which is disposed between the second supply port and the second pump port;

a first actuator side pilot check valve which is disposed between the first direction port and the first actuator port;

a second actuator side pilot check valve which is disposed between the second direction port and the second actuator port;

a first actuator side pilot path which is disposed so that the pressure of the operating fluid from the second direction port is served as a pilot pressure on the first actuator side pilot check valve;

a second actuator side pilot path which is disposed so that the pressure of the operating fluid from the first direction port is served as a pilot pressure on the second actuator side pilot check valve;

a first supply side pilot path which is disposed so that the pressure of the operating fluid from the second supply port is served as pilot pressure on the first supply side pilot check valve;

a second supply side pilot path which is disposed so that the pressure of the operating fluid from the first supply port is served as pilot pressure on the second supply side pilot check valve; and a switching valve which is disposed between the first pump port and the second pump port so as to open and close a flowing path of the operating fluid through the hand pump.

6. The apparatus operating a hydraulic actuator for opening and closing a valve according to claim 5, further comprising a first relief valve which is provided between the first actuator port and the first direction port so as to be parallel with the first actuator side pilot check valve and functions to reduce the pressure of the operating fluid in the hydraulic actuator, and a second relief valve which is provided between the second actuator port and the second direction port so as to be parallel with the second actuator side pilot check valve and functions to reduce the pressure of the operating fluid in the hydraulic actuator.

* * * * *